United States Patent Office 2,990,594
Patented July 4, 1961

2,990,594
SHELL MOLDING COMPOSITION AND PROCESS
John R. Lewis, Elsmere, Wilmington, Del., assignor to Hercules Powder Company, Wilmington, Del., a corporation of Delaware
No Drawing. Filed Sept. 23, 1955, Ser. No. 536,300
13 Claims. (Cl. 22—193)

The present invention relates to a process for molding foundry shells and to a composition especially suitable for use in said process.

In recent years there has been developed an important new method, known as the shell molding process or "C" process, for simplifying and improving foundry shell mold and core making. This new development has created widespread interest not only in foundries but in resin and machinery manufactures. For the first time, it offers an opportunity for the mechanization of an industry that has changed very little for centuries.

Briefly described, the shell molding process comprises contacting a mixture of pulverized binder and sand with a hot metal pattern, allowing the binder in said mixture to fuse and cure, and removing the resulting molded article from said pattern. In a modification of the process, sand coated with binder is used in place of a simple sandbinder mixture. The binder most commonly used is a phenolaldehyde resin.

Early in the development of the shell molding process it was recognized that a means of lowering the cost of the binder was desirable. For this reason, resin manufacturers and foundries began searching for an inexpensive material which could be used as an extender for a phenolaldehyde resin. It was earlier found that a material which is satisfactory for this purpose is substantially petroleum hydrocarbon-insoluble pine wood resin. More specifically, it was found that when the phenolic resin is extended by physical blending with up to 50-60% by weight of substantially petroleum hydrocarbon-insoluble pine wood resin, not only is a considerable saving in cost achieved but also that shell moldings prepared from the extended resin unexpectedly have greatly increased resistance to thermal shock, i.e., the molds are much less likely to crack or break when hot metal is poured into them.

Despite the advantages which are attributable to the inclusion of substantially petroleum hydrocarbon-insoluble pine wood resin in the shell molding composition, the use of phenolaldehyde resins so extended presents the disadvantages that the molds formed therefrom are weaker than similar molds prepared from an unmodified phenolaldehyde resin, and even more important, that the use of such extended resins results in sticking of the cured shell to the pattern and in the formation of a resinous deposit on the metal pattern which is difficult to remove. This problem of resinous deposits on the pattern has been found to be quite troublesome even when common mold release agents are employed to lubricate the pattern. While some recently developed mold release agents can be used on the pattern to minimize or eliminate the resinous deposits, the use of such agents is not always practicable or desirable. Consequently, the problem continues to exist and is a serious deterrent to the employment of substantially petroleum hydrocarbon-insoluble pine wood resin as an extender for the phenolaldehyde resins.

In accordance with the present invention, it has been discovered that the difficulties caused by sticking and by the formation of resinous deposits when simple pulverized blends of substantially petroleum hydrocarbon-insoluble pine wood resin and a phenolaldehyde resin are used as a binder are reduced considerably by employing instead of such blends a fused blend of a substantially petroleum hydrocarbon-insoluble pine wood resin and a phenolaldehyde resin of the novolak type. It has been found further that the molds produced from this latter binder are considerably stronger than similar molds prepared using the aforesaid pulverized blends. It has been found further that these advantages are realized to an even greater extent when the substantially petroleum hydrocarbon-insoluble pine wood resin is modified by reaction with furfural prior to fusion with the novolak resin.

The molding composition of the invention arising from the aforesaid discovery comprises a major amount of sand and a minor amount of a binder prepared by fusing together substantially petroleum hydrocarbon-insoluble pine wood resin and a phenolaldehyde novolak resin which pine wood resin may or may not be modified by reaction with furfural prior to blending. The process of the invention comprises contacting said molding composition with a hot metal pattern, allowing the binder to fuse and cure on the pattern and removing a molded form from the pattern.

In order to illustrate the invention in greater detail, the following examples are presented. Parts and percentages are by weight unless otherwise specified.

Example 1

Into a reaction vessel there was placed 300 parts of phenol, 235.5 parts of formalin (37% formaldehyde), 16 parts of water and 1.05 parts of 37% hydrochloric acid. This reaction mixture was refluxed for 77 minutes and was then dehydrated by the application of vacuum while continuing the supply of heat to the reaction vessel. The dehydration caused the reaction mixture to reach a minimum temperature of 48° C. 7 minutes after the start of dehydration and the temperature thereafter rose to 130° C. at the end of 37 minutes. There was then added to the dehydrated phenolaldehyde resin just prior to dehydration 152.3 parts of molten substantially petroleum hydrocarbon-insoluble pine wood resin. The molten blend was then poured and allowed to cool and solidify.

The cooled and solidified blend was next ground to a size of 100% through 200 mesh and blended with 10% of its weight of hexamethylenetetramine and 7 parts of the resulting mixture was blended with 93 parts of sand (New Jersey Silica No. 100–110) in a tumbler mixer.

In one test, designed to measure the tendencies of the composition to stick or form resin deposits on a molding pattern, the pattern comprised a removable beveled edge polished steel disk 3 inches in diameter by ⅜ inch thick attached to a flat steel plate so as to leave ¼ inch of the disk above the plate. The plate was equipped with an ejection ring to remove baked shells without scratching of the plate or disk. This assembly rested on another flat steel plate containing properly aligned holes to allow the ejection ring to be flush with the pattern surface during heating of the shells. Removal of the cured shell molds was effected by merely forcing the ejection ring upward to strip the shell from the pattern. In the molding operation approximately 70 parts of the molding composition was spread about ⅜ inch thick and about 5 inches in diameter over the surface of the pattern which was maintained at a predetermined temperature. Heating was continued for a specified interval and the shell removed. Using the composition of this example, the pattern was lubricated by Dow-Corning Compound No. 20 (a silicone mold release agent) and maintained at a temperature of 400° C. After having made several shells, essentially no sticking or resinous deposits on the pattern were observed.

In another shell molding experiment, designed to measure the tensile strength of finished shells, about 100 parts of the molding composition was poured onto a hot mold (400° F.) having a dumbbell shaped cavity, excess resin was removed by scraping and the complete mold was then placed in a forced draft oven at a temperature of 400° F. where it was allowed to remain for 2 minutes. The dumbbell shaped specimen was then immediately stripped from the mold and cooled to room temperature. The specimen was then tested for tensile strength. Using the composition of the invention, specimens having a tensile strength of 242 p.s.i. were prepared.

*Example 2*

Into a reaction vessel there was charged 10 parts of substantially petroleum hydrocarbon-insoluble pine wood resin, 1 part of distilled furfural and 0.1 part of disodium phosphate with continuous agitation. The reaction vessel was then heated and in a period of 1.0 hour the reaction mixture reached a temperature of 125° C. and was held between 125 and 135° C. for 3 hours. The reaction mass was then discharged into shallow trays and allowed to cool and solidify. Analysis showed that 0.6 part of the furfural had reacted with the pine wood resin while 0.4 part remained uncombined. The condensate had a softening point of 127° C.

Into a resin kettle there was placed 300 parts of phenol, 235.5 parts of formalin (37% formaldehyde), 16 parts of water and 1.05 parts of 37% hydrochloric acid. This reaction mixture was refluxed for 77 minutes and then dehydrated by the application of vacuum while continuing the supply of heat to the reaction vessel. Evaporation of water caused the reaction mixture to drop to a minimum temperature of 48° C. seven minutes after the start of dehydration and the temperature thereafter rose to 130° C. at the end of 37 minutes. The molten resin was poured and allowed to cool and solidify.

The cooled and solidified resin was next broken into lumps and 4 parts of the lump resin was fused by heating with 3 parts of the furfural-modified substantially petroleum hydrocarbon-insoluble pine wood resin above described. The fused blend was then discharged from the mixing vessel and allowed to cool and solidify.

A molding composition was next prepared by pulverizing the fused blend to a mesh size less than 325 and then blending together by tumbling 6.3 parts of the pulverized blend, 0.7 part of hexamethylenetetramine and 93 parts of sand (New Jersey Silica No. 100–110). The molding composition was next evaluated in a shell molding operation to make shells having a semicylindrical shape. In this operation the molding composition was dropped on a hot (260° C.) metal pattern from an inverted drop box and after 20 seconds excess composition was removed by rotating the pattern. The pattern with adhering composition was then placed in an oven at a temperature of about 420° C. for 2 minutes. The shell was then stripped from the pattern which had been previously lubricated with carnauba wax, a mold release agent which is ineffective when used as a parting agent when the binder in the molding composition is a pulverized blend of substantially petroleum hydrocarbon-insoluble pine wood resin and phenolaldehyde resin.

A total of more than 150 shells were made in the above manner without noticeable sticking to the pattern or formation of deposits on the pattern.

In contrast to the above results, a molding composition comprising 7 parts of a binder consisting of a pulverized blend of 43% substantially petroleum hydrocarbon-insoluble pine wood resin and 57% of a commercial phenol-formaldehyde novolak plus 10% hexamethylenetetramine based on the weight of resin and 93 parts of the same sand was used to make molds by the same procedure. After only 5 molds were prepared, excessive sticking and resinous deposits on the pattern were observed. Further operation of this latter process was impractical without tedious recleaning of the pattern.

The preparation of novolak type phenolaldehyde resins is well known in the art. Briefly, such resins are prepared by reacting a phenol with less than one molar equivalent but more than 0.6 molar equivalent of an aldehyde in the presence of an acid catalyst.

The usual ingredients and manipulative procedures employed in the art for the preparation of novolak resins can be used to prepare novolag resins for use in the present invention. Thus, the phenol utilized in the preparation of the resin can be any of those used in the preparation of phenolaldehyde resins, and the term "a phenol" is used herein to refer to phenolic compounds generally that are suitable for reacting with aldehydes to form thermosetting resins of the phenolformaldehyde type. This class of compounds is well known in the phenolformaldehyde art and includes phenol itself, that is, hydroxybenzene, and substituted phenols characterized by having three active hydrogen atoms (the 2,4,6 positions) attached to the ring. Thus, m-substituted phenols, for example, m-cresol, m-ethylphenol and higher alkyl m-substituted phenols or mixtures of m-substituted phenols and o- or p-substituted phenols may be utilized in this invention. Also di-substituted phenols in which the substituent groups are attached to the 3 and 5 positions of the ring are useful. Thus, 3,5-dimethylphenol, 3,5-diethylphenol, 3,5-dipropylphenol, 3-methyl-5-ethylphenol, 3-methyl-5-propylphenol, 3-ethyl-5-propylphenol and 3,5-di-substituted phenols in which the substituents are groups having a larger number of carbon atoms may be utilized. Preferably, however, the substituents attached to the phenolic nucleus in the case of both mono-substituted and di-substituted phenols will be alkyl groups and will be lower alkyl groups, that is, alkyl groups containing less than about 8 carbon atoms. Polyhydric phenols such as resorcinol also may be used, preferably in conjunction with a monohydric phenol such as phenol itself. Phenol is the preferred phenolic compound in carrying out this invention by reason of its availability in highly pure form as well as its reactivity.

Likewise the aldehyde utilized in the process of the invention may be any aldehyde suitable for preparing phenolaldehyde thermosetting resins, and the term "an aldehyde" is used as inclusive of all such aldehydes. This class of aldehydes is well known to the art and includes, in addition to formaldehyde, compounds which are capable of engendering formaldehyde under the conditions of reaction. Thus, paraformaldehyde, hexamethylene-tetramine and dimethyl formal can be used. Also included are aldehydes such as glyoxal, furfural, acetaldehyde, propionaldehyde, butyraldehyde, etc. The advantages of the invention are most apparent when the aldehyde is formaldehyde or a compound engendering formaldehyde.

The amount of formaldehyde or other aldehyde used in the production of the modified phenolaldehyde resins can be widely varied to provide products having the desired characteristics. The quantity of aldehyde utilized should be such that the molar ratio of aldehyde to the moles of the phenol is from about 0.6:1 to about 0.9:1.

The reaction will take place in the absence of a catalyst but usually a catalyst is desirable to provide a product of most suitable characteristics. The usual acids employed to catalyze the reaction can be employed. Hydrochloric acid, sulfuric acid or organic acids are typical catalysts. The amount of catalyst used is not particularly critical and may be varied over wide limits but usually an amount of catalyst above about 20% by weight of the phenolic content of the reaction mixture will not be necessary and an amount of catalyst as low as 0.01% by weight of the phenolic content will be beneficial.

The general procedure for reacting the phenol and the aldehyde is well known to the art and comprises simply agitating the reactants in aqueous medium, normally in the presence of a catalyst. Generally, the reaction is carried out at a temperature within the range of about 20° C. to about 200° C. and preferably about 80° C. to about 110° C. The reaction time wil be directly dependent on the temperature employed and will usually be within the range of about 1-24 hours. The reaction is continued until the desired degree of condensation has been obtained and the product resin is of suitable character for use. The reaction mixture is then dehydrated and the resulting resin allowed to solidify.

The pine wood resin used in accordance with the present invention may be defined as the substantially petroleum hydrocarbon-insoluble pine wood resin prepared, for example, in accordance with the processes of U.S. Patents to Hall, Nos. 2,193,026 and 2,221,540. This material, which is characterized herein by the term "substantially petroleum hydrocarbon-insoluble pine wood resin," is the resinous material which can be prepared from pine wood as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. This resin is of a phenolic character and for the purposes of this invention its molecular weight is 450.

As previously pointed out, the substantially petroleum hydrocarbon-insoluble pine wood resin may be used in the form in which it comes into commerce or may be modified by reaction with furfural prior to blending with the phenolaldehyde resin. Actually, the furfural-modified pine wood resin is preferred in view of the fact that superior results are ordinarily obtained therewith. The modification with furfural can be accomplished by heating the pine wood resin with from about 1 to 50% of its weight of furfural. In general, a temperature of from about 50° C. to about 200° C. will effect the desired reaction in a period of time varying from 15 minutes to 12 hours. Further details on the modification of substantially petroleum hydrocarbon-insoluble pine wood resin by reaction with furfural can be found in U.S. Patent 2,141,043 to Cornelis Maters.

The binder ingredient of the novel molding composition is prepared simply by fusing together the novolak resin and the substantially petroleum hydrocarbon-insoluble pine wood resin. This can be accomplished by heating the two ingredients together or by heating them separately and then mixing in the molten state. Temperatures within the range of 125 to 200° C. are generally sufficient to achieve complete fusion. Generally, the amount of substantially petroleum-insoluble pine wood resin (or its furfural modification) will range from 1 to 200% of the weight of novolak resin, more preferably from about 10 to about 100% of the weight of resin.

In preparing the molding composition of the invention, the binder is first pulverized to a desired mesh size, say from about 150 mesh to about 325 mesh, and then blended with sand. Usually the composition will comprise from about 3 to 10 parts of binder to about 90 to 97 parts of sand. Since the binder is of the novolak type, it is necessary also to include a conventional hardening agent such as hexamethylenetetramine in an amount ranging from about 3 to about 20% by weight of the binder. In another modification, the molding composition can be prepared by dissolving the binder in a solvent, coating the sand therewith and removing the solvent by evaporation. Alternatively, the sand can be heated and coated with solid or molten binder.

The process of the invention is, of course, characterized by the use of the composition of the invention. The manipulative techniques involved in the process are those already known to the art as hereinbefore described. In the process, the binder component of the composition can be caused to fuse and cure in approximately the same length of time and at the same temperatures as a conventional phenol-aldehyde binder. Generally, the time required will vary from ½ to 10 minutes and the temperature can vary from 150 to 650° C.

What I claim and desire to protect by Letters Patent is:

1. A molding composition comprising a major amount of sand and a minor amount of a binder prepared by blending together in the molten state a substantially petroleum hydrocarbon-insoluble pine wood resin and a phenolaldehyde novolak resin.

2. The composition of claim 1 in which the substantially petroleum hydrocarbon-insoluble pine wood resin is modified by reaction with from 1 to 50% of its weight of furfural prior to blending together in the molten state with said phenolaldehyde resin.

3. A molding composition comprising a major amount of sand and a minor amount of a binder formed by blending together in the molten state a substantially petroleum hydrocarbon-insoluble pine wood resin and a phenolformaldehyde novolak resin.

4. The composition of claim 3 in which the substantially petroleum hydrocarbon-insoluble pine wood resin is modified by reaction with from 1 to 50% of its weight of furfural prior to blending together in the molten state with said phenolformaldehyde resin.

5. A molding composition comprising a major amount of sand and a minor amount of binder formed by blending together in the molten state a substantially petroleum hydrocarbon-insoluble pine wood resin and a phenolformaldehyde novolak resin, the amount of substantially petroleum hydrocarbon-insoluble pine wood resin being equal to 1 to 200% of the weight of phenolformaldehyde resin.

6. The composition of claim 5 in which the substantially petroleum hydrocarbon-insoluble pine wood resin is modified by reaction with from 1 to 50% of its weight of furfural prior to blending together in the molten state with said phenolformaldehyde resin.

7. A process of shell molding which comprises contacting the molding composition of claim 1 with a hot pattern, allowing the binder to fuse and cure on the pattern, and removing a molded shell from the pattern.

8. A process of shell molding which comprises contacting the molding composition of claim 2 with a hot pattern, allowing the binder to fuse and cure on the pattern, and removing a molded shell from the pattern.

9. A process of shell molding which comprises contacting the molding composition of claim 3 with a hot pattern, allowing the binder to fuse and cure on the pattern, and removing a molded shell from the pattern.

10. A process of shell molding which comprises contacting the molding composition of claim 4 with a hot pattern, allowing the binder to fuse and cure on the pattern, and removing a molded shell from the pattern.

11. A process of shell molding which comprises contacting the molding composition of claim 5 with a hot pattern, allowing the binder to fuse and cure on the pattern, and removing a molded shell from the pattern.

12. A process of shell molding which comprises contacting the molding composition of claim 6 with a hot pattern, allowing the binder to fuse and cure on the pattern, and removing a molded shell from the pattern.

13. A molding composition for application to a hot pattern to form a shell mold, said molding composition, before application to the hot pattern, consisting essentially of sand, a binder prepared by fusing together substantially petroleum hydrocarbon-insoluble pine wood resin and a phenolaldehyde novolak resin, and a small amount of a binder curing agent.

References Cited in the file of this patent

UNITED STATES PATENTS

| | | |
|---|---|---|
| 2,101,330 | De Laney | Dec. 7, 1937 |
| 2,141,043 | Maters | Dec. 20, 1938 |
| 2,683,296 | Drumm et al. | July 13, 1954 |
| 2,751,650 | Froberger | June 26, 1956 |